United States Patent
Eaves

(10) Patent No.: US 9,853,689 B2
(45) Date of Patent: Dec. 26, 2017

(54) PACKET ENERGY TRANSFER POWER CONTROL ELEMENTS

(71) Applicant: VoltServer, Inc., East Greenwich, RI (US)

(72) Inventor: Stephen Spencer Eaves, Charlestown, RI (US)

(73) Assignee: VoltServer, Inc., East Greenwich, RI (US)

( * ) Notice: Subject to any disclaimer, the term of this patent is extended or adjusted under 35 U.S.C. 154(b) by 140 days.

(21) Appl. No.: 14/933,941

(22) Filed: Nov. 5, 2015

(65) Prior Publication Data

US 2016/0134331 A1 May 12, 2016

Related U.S. Application Data

(60) Provisional application No. 62/077,074, filed on Nov. 7, 2014.

(51) Int. Cl.
*H04B 3/54* (2006.01)

(52) U.S. Cl.
CPC .................................... *H04B 3/54* (2013.01)

(58) Field of Classification Search
CPC ....... H02J 3/12; H02J 3/16; H02J 3/18; H04L 12/10; H04B 3/54; H04B 3/542; H04B 3/548
See application file for complete search history.

(56) References Cited

U.S. PATENT DOCUMENTS

| | | | |
|---|---|---|---|
| 8,810,217 B2* | 8/2014 | Malmberg | H02J 1/102 323/272 |
| 9,419,436 B2* | 8/2016 | Eaves | H04B 3/542 |
| 2009/0204268 A1 | 8/2009 | Eaves | |
| 2012/0075759 A1 | 3/2012 | Eaves | |
| 2013/0103220 A1 | 4/2013 | Eaves | |
| 2015/0207318 A1 | 7/2015 | Lowe et al. | |
| 2015/0215001 A1 | 7/2015 | Eaves | |

OTHER PUBLICATIONS

US Patent and Trademark Office, International Search Report and Written Opinion for PCT/US15/59384 (related PCT pplication) (dated Feb. 2, 2016).

* cited by examiner

*Primary Examiner* — An Luu
(74) *Attorney, Agent, or Firm* — Modern Times Legal; Robert J. Sayre

(57) ABSTRACT

In a digital power system a digital power receiver is electrically coupled with a power control element to receive electrical current therefrom. The power control element includes (i) a power conditioning circuit electrically coupled with an electrical power source and (ii) element controller circuitry electrically coupled with the power conditioning circuit. The element controller circuitry is configured to control and receive feedback from the power conditioning circuit, to receive a communication/synchronization signal, and to output digital power under packet energy transfer protocol.

19 Claims, 7 Drawing Sheets

PACKET ENERGY TRANSFER POWER CONTROL ELEMENTS

RELATED APPLICATION

This application claims the benefit of U.S. Provisional Application No. 62/077,074, filed 7 Nov. 2014, the entire content of which is incorporated herein by reference.

BACKGROUND

Digital electric power can be characterized as any power format where electrical power is distributed in discrete, controllable units of energy. Packet Energy Transfer (PET) is a new digital electric power protocol that has been disclosed by inventor Stephen S. Eaves in U.S. Pat. No. 8,068,937, "Power Distribution System with Fault Protection Using Energy Packet Confirmation". A representative digital electric power distribution system using PET protocol is described in Eaves' U.S. Pat. No. 8,781,637 B2 (Eaves 2012).

The primary discerning factor in a digital power transmission system compared to traditional, analog power systems is that the electrical energy is separated into discrete units, and the individual units of energy can be associated with analog and/or digital information that can be used for the purposes of optimizing safety, efficiency, resiliency, control or routing.

As described by Eaves 2012, a source controller and a load controller are connected by power transmission lines. The source controller of Eaves 2012 periodically isolates (disconnects) the power transmission lines from the power source and analyzes, at a minimum, the voltage characteristics present at the source controller terminals directly before and after the lines are isolated. The time period when the power lines are isolated was referred to by Eaves 2012 as the "sample period" and the time period when the source is connected is referred to as the "transfer period". The rate of rise and decay of the voltage on the lines before, during and after the sample period reveal if a fault condition is present on the power transmission lines. Measurable faults include, but are not limited to, short circuit, high line resistance or the presence of an individual who has improperly come in contact with the lines. Since the energy in a PET system is transferred as discrete quantities, or quanta, it can be referred to as "digital power".

A representative digital power system as originally described in Eaves 2012 is shown in FIG. 1. The system is comprised of a source 1 and at least one load 2. The PET protocol is initiated by operating switching means 3 to periodically disconnect the source from the power transmission lines. When the switch is in an open (non-conducting) state the lines are also isolated from any stored energy that may reside at the load by isolation diode (D1) 4. Capacitor ($C_3$) 5 is representative of an energy storage element on the load side of the circuit.

The transmission lines have inherent line-to-line resistance ($R_4$), 6 and capacitance ($C_1$) 7. The PET system architecture, as described by Eaves 2012, adds additional line to line resistance ($R_3$) 8 and capacitance ($C_2$) 9. At the instant switch 3 is opened, $C_1$ and $C_2$ have stored charge that decays at a rate that is inversely proportional to the additive values of $R_4$ and $R_3$. Capacitor ($C_3$) 5 does not discharge through $R_3$ and $R_4$ due to the reverse blocking action of the isolating diode (D1) 4. The amount of charge contained in $C_1$ and $C_2$ is proportional to the voltage across them, and can be measured at points 10 by a source controller 11.

As described in Eaves 2012, a change in the rate of decay of the energy stored in $C_1$ and $C_2$ can indicate that there is a cross-line fault on the transmission lines. The difference between normal operation and a fault, as presented by Eaves 2012 is illustrated in FIG. 2.

US Patent App. Pub. No. 2015/0207318 A1, "Digital Power Network Method and Apparatus", hereafter referred to as "Lowe 2014", introduced the concept of multiple sources of power and multiple loads connected together safely in a digital power network using Packet Energy Transfer. The concept of a power control element (PCE) was introduced in Lowe 2014 as a primary component in a digital power network. An illustration of a power control element 12 is depicted in FIG. 3.

Power control elements perform one or more of the following functions:
- perform safe transfer of energy under Packet Energy Transfer (PET) protocol,
- convert from analog power to digital power under PET protocol, or vice versa,
- convert and/or control voltage and/or current, and/or
- switch power from one PET channel to another PET channel within the network.

A PCE can be employed to manage the charge and discharge of an energy storage device, such as a battery. PCEs can manage the extraction of energy from a power source, such as a solar panel; alternatively, PCEs provide power to a load, such as a light emitting diode (LED) light.

SUMMARY

Digital power systems and methods for configuring a power control element in a digital electric power network are described herein, where various embodiments of the systems and methods may include some or all of the elements, features and steps described below.

This invention relates to methods and apparatus for configuring power control elements in a digital electric power network. More specifically, this invention relates to a method and apparatus for the configuration of digital electric power control elements to manage individual power sources, in series-parallel configurations, to achieve desired voltage and current capability. Phase shifting or interleaving of energy packets is employed to improve power quality.

Whereas Eaves 2012 described a digital power system comprised comprising a single source and a single load device, and whereas Lowe 2014 extended the technology to include multiple sources and loads integrated into a digital power network, the management of power to and from PCEs in series-parallel arrangements to produce higher distribution voltages and/or currents is described herein. Additionally, this disclosure introduces the concept of phase shifting (often referred to as interleaving) parallel streams of energy packets to achieve higher power quality. In the context of the present invention, interleaving is where a plurality of PET channels stagger the transmission of energy packets over time. Since it is normal for a channel under PET protocol to interrupt the flow of current, interleaving prevents all of the channels from interrupting line current simultaneously. This staggering reduces the peak demand on the power distribution system, reduces electromagnetic interference, and reduces the size and cost of filter components such as capacitors and inductors.

Embodiments of a digital power system includes the following: at least one electrical power source; at least one power control element; and a digital power receiver electrically coupled with the power control element to receive electrical current therefrom. The power control element includes (i) a power conditioning circuit electrically coupled with the electrical power source and (ii) element controller circuitry electrically coupled with the power conditioning circuit and configured to control and receive feedback from the power conditioning circuit, to receive a communication/synchronization signal, and to output digital power under packet energy transfer protocol.

A method for configuring a power control element in a digital electric power network, comprises: delivering a flow of electrical current to at least one power control element comprising a power conditioning circuit and element controller circuitry including a plurality of packet-energy-transfer switches that control the flow of the electrical current through packet-energy-transfer transmission line pairs in the power control element; using the power conditioning circuit to stabilize, regulate or convert an input voltage of the electrical current flow in the power control element; using the element controller circuitry to receive the current flow from the power conditioning circuit, to control and receive feedback from the power conditioning circuit, and to output digital power under packet energy transfer protocol from the power control element; communicating a communication/synchronization signal to the element controller circuitry to selectively open and close different packet-energy-transfer switches in sequence; and delivering to a digital power receiver the output digital power under packet energy transfer protocol, wherein the output digital power is delivered from at least one packet-energy-transfer transmission line pair controlled by at least one closed packet-energy-transfer switch in the power control element.

Figure 1:
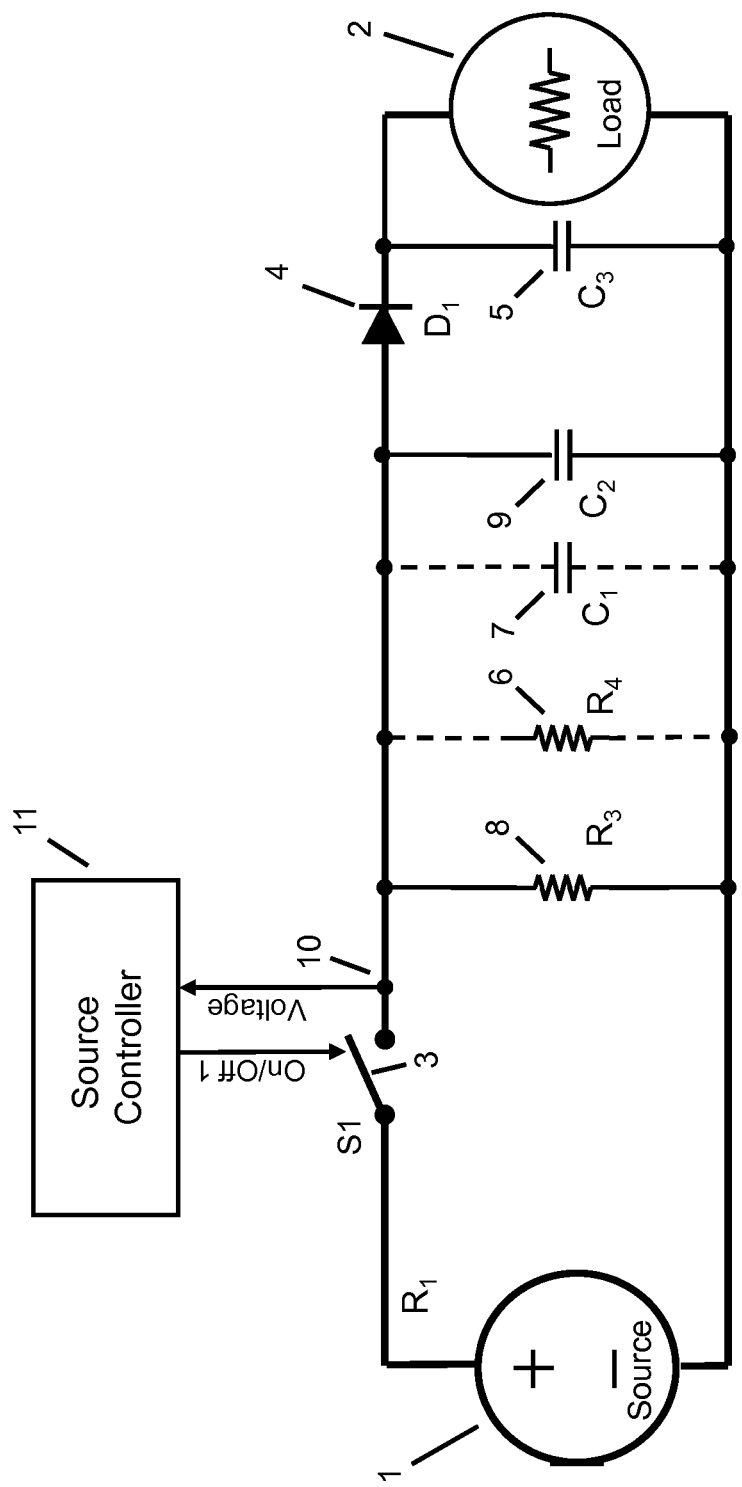
FIG. 1 schematically shows a representative digital power system, comprising a source 1, at least one load 2, and a source controller 11.
Figure 2:
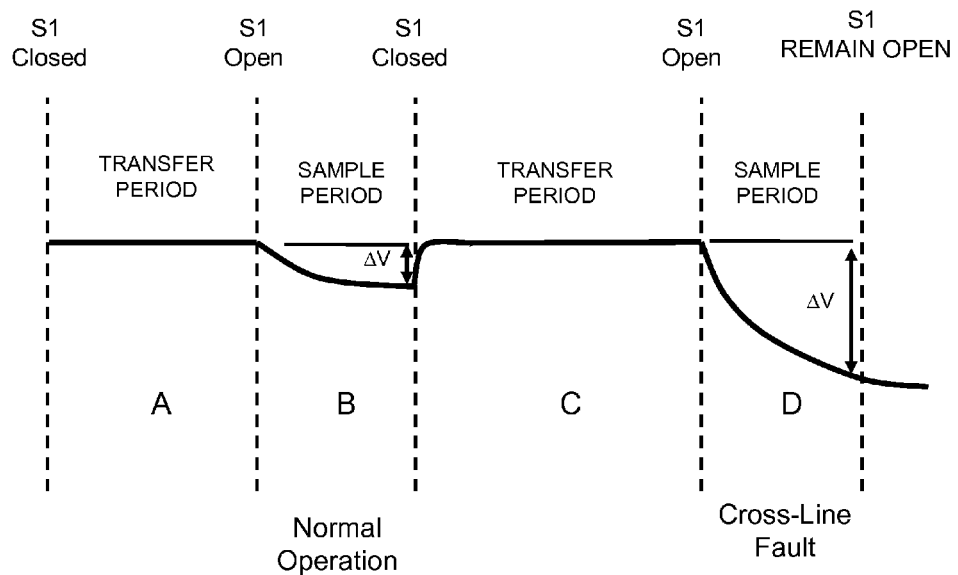
FIG. 2 illustrates the difference in voltage change between normal operation and a fault in the operation of the system of FIG. 1.
Figure 3:
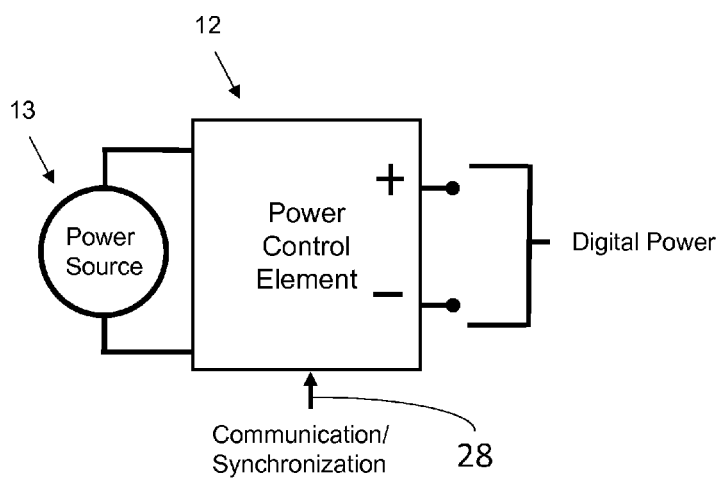
FIG. 3 is a schematic illustration of a power control element 12 coupled with a power source 13.

In the accompanying drawings, like reference characters refer to the same or similar parts throughout the different views; and apostrophes are used to differentiate multiple instances of the same or similar items sharing the same reference numeral. The drawings are not necessarily to scale; instead, an emphasis is placed upon illustrating particular principles in the exemplifications discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Figure 4:
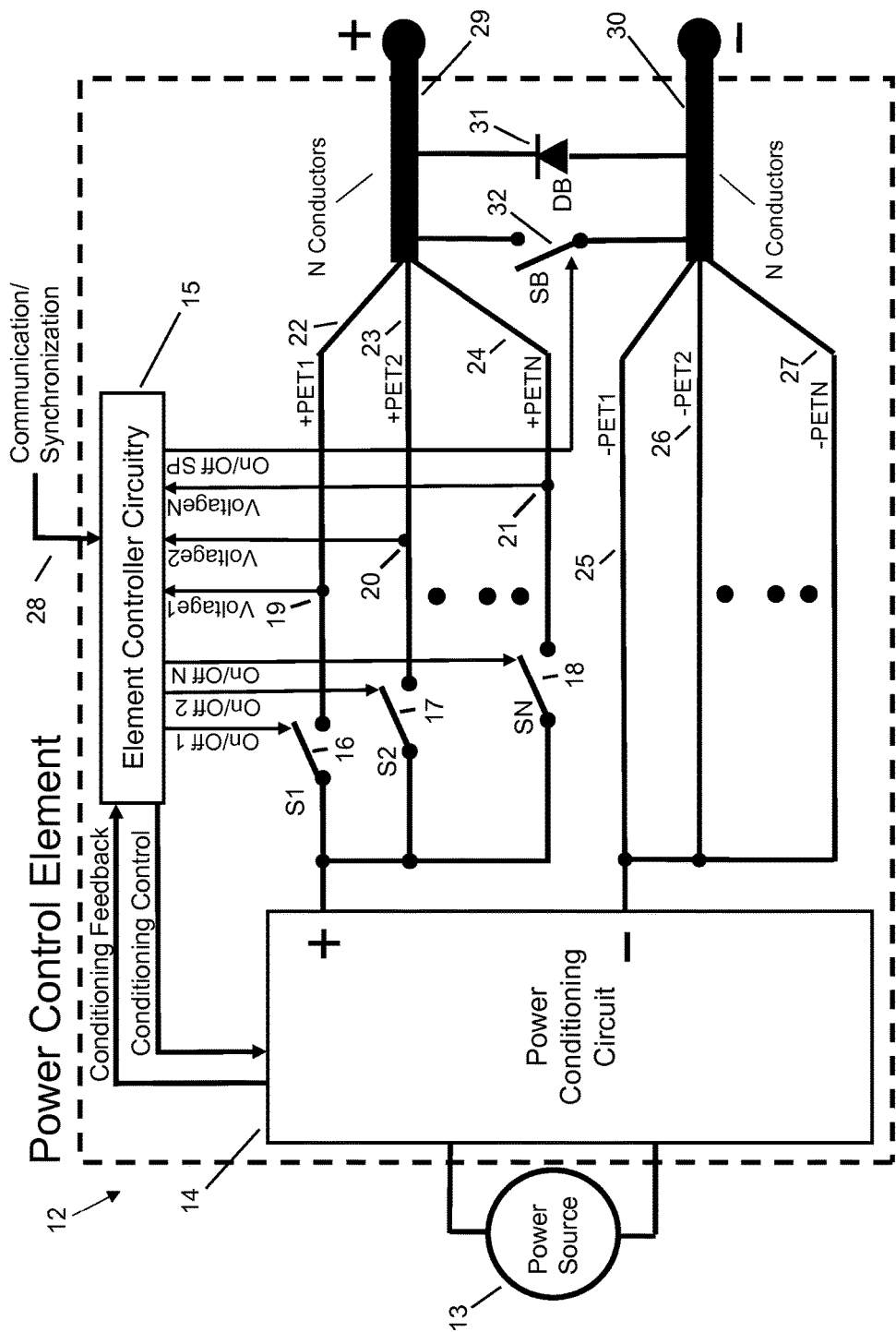
FIG. 4 schematically shows an embodiment of a digital power system, wherein a communication/synchronization signal 28 is used to allow interleaving to be coordinated among multiple PCEs 12 and among multiple PET switches within each PCE 12, as well as exchange control and monitoring date between the PCEs 12 and a receiver of digital power.

An internal diagram of a power control element (PCE) 12 is provided in FIG. 4. The PCE 12 is connected to the terminals of a power source 13. Of note is that the power source 13 can be an energy storage device that either provides or receives energy. The power source 13 is connected to a power conditioning circuit 14 in the PCE 12. The output of the PCE 12 is digital power under packet energy transfer protocol.

Power conditioning circuits 14 take an input voltage and provide stabilization, regulation or conversion to another voltage level. The power conditioning circuits 14 can also provide isolation to electrically isolate the input terminals from the output terminals. The power conditioning circuit 14 can also convert a DC input to an AC output. As employed in a PCE 12, the power conditioning circuit 14 can be bi-directional, allowing power to flow either from or to the power source 13. This bi-directionality may be necessary if the power source 13 is also an energy storage device, such as a battery. In its most basic form, a power conditioner can be a simple filter capacitor or an electrical switch (solid state or mechanical) that either allows or inhibits current flow. Some of the most power dense conditioning circuits 14 are known in the industry as switch-mode power converters. Some of the most common non-isolated topologies well known to the industry include but are not limited to boost, buck, buck-boost, Ćuk, SEPIC and charge-pump/switched capacitor. Isolated topologies include flyback, forward, push-pull and resonant converters.

The power conditioning circuit 14 receives supervisory control from and provides feedback to the element controller circuitry 15. The element controller circuitry 15 can provide very low level control to the power conditioning circuit 14, such as the control of individual power semiconductor switches used in power conversion; in additional embodiments, the element controller circuitry 15 can provide very high level functions that supplement the low level control performed by an embedded controller that resides as part of the power conditioning circuit 14. The element controller circuitry 15 manages a series of PET switches, or disconnect devices (S1, S2, . . . SN) 16, 17, 18 that are needed to execute PET protocol. As described in detail in Eaves 2012, the PET switches S1, S2, . . . SN can be power semiconductor devices but may also take other forms, such as an electromechanical relay. Voltage sensing points 19, 20, and 21 are used to execute packet energy transfer protocol, as described in Eaves 2012.

Each PET switch controls an individual PET conductor 22/23/24 that leaves the PCE 12 as a cable bundle 29. Corresponding negative conductors 25, 26, and 27 provide a return path for the transmission line currents, and each leaves the PCE 12 as cable bundle 30.

Whereas Eaves 2012 described a controller that was responsible for a single PET switch, the present method allows the controller to manage a plurality of PET switches S1, S2, . . . SN for individual PET transmission line pairs. Moreover, the power control element (PCE) 12 described herein has the ability to stagger (or interleave) the transfer of energy packets to minimize the impact on the power system. Since the electrical current from the power source 13 to individual PET conductors 22-24 is interrupted each packet period, it is advantageous to avoid having the interruption occur simultaneously on all of the channels. For example, if each PET transmission line pair is operating at one Ampere of current, then three pairs transmitting without interleaving will result in the power source 13 seeing a transition from 0 to 3 Amperes each packet period. In terms of a 1.5 ms packet period, the transition will be from 0 to 3 Amperes every 1.5 ms. Using interleaving, the PET packets from the three PET transmission line pairs can be staggered over the 1.5 ms period, resulting in a condition where at any instance, two pairs are conducting while a third is non-conducting. This results in a condition where the current drawn from the power source 13 transitions from 2 Amperes to 3 Amperes three times every 1.5 ms. The configuration need not be limited to a total of three PET switches; as few as one PET switch to as many as are practical for the application may be implemented. Electrical filtering components, such as capacitors, can be used to limit the current transitions seen directly by the power source 13; but, in any case, interleaving can dramatically reduce the size, weight and cost of the components.

Figure 5:
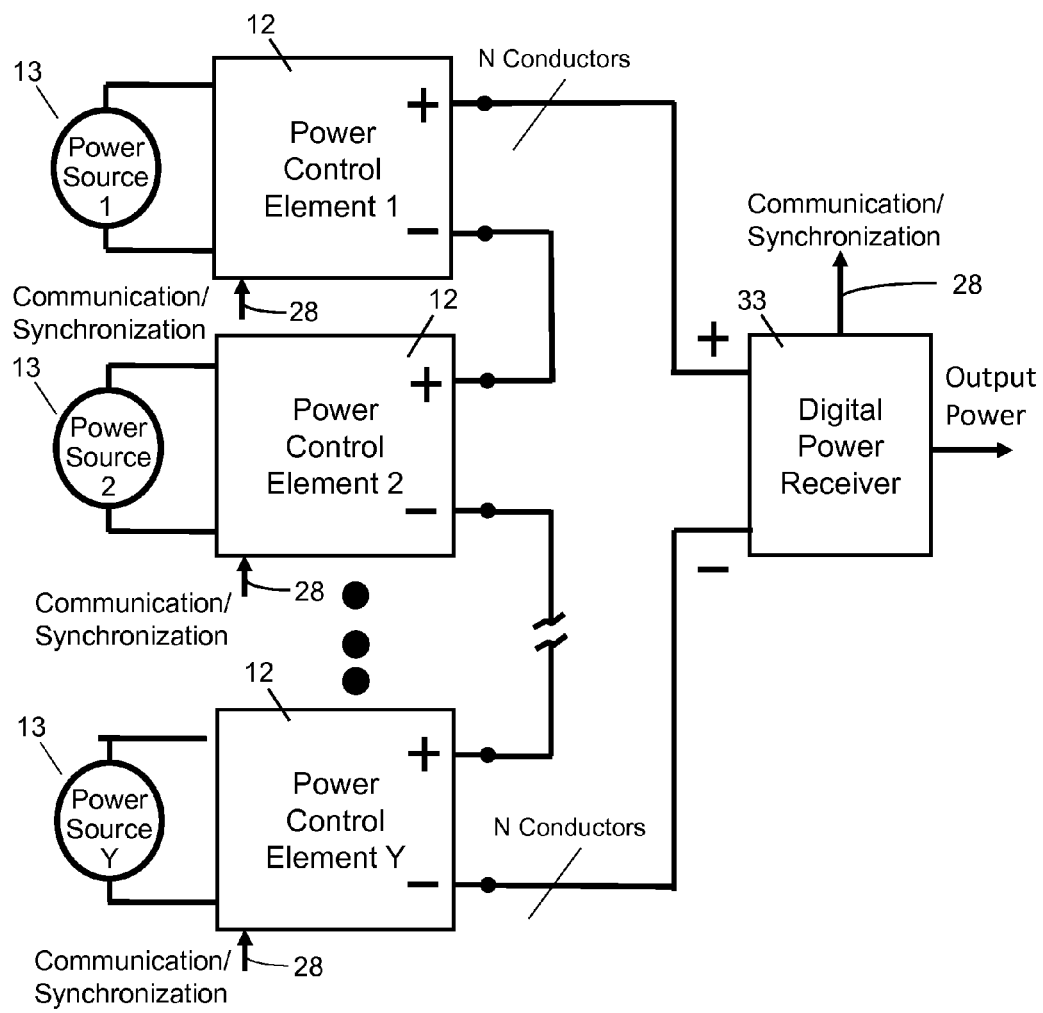
FIG. 5 schematically shows an embodiment of a series arrangement of PCEs 12 supplying a digital power receiver 33 that is the source of a communication/synchronization signal 28.

As will be described later in this specification, multiple PCEs 12 can be combined in series and/or in parallel to achieve higher levels of voltage and/or current. One embodiment of a series arrangement of PCEs 12 supplying a digital power receiver 33 is depicted in FIG. 5. Referring to FIG. 4, a communication/synchronization signal 28 is used to allow interleaving to be coordinated among multiple PCEs 12 and among multiple PET switches S1, S2, . . . SN within each PCE 12, as well as exchange control and monitoring data between the PCEs 12 and a receiver 33 of digital power. The synchronization signal 28 can be provided as a discrete signal, or it can be imbedded in a serial data stream. Multiple options for communication in a PET system were described in Eaves 2012 that detailed communication hardware and protocols including RS-232, RS-485, CAN bus, Firewire and others. Communication can be established using copper conductors, fiber optics or wirelessly. Wireless communication can be established using any of a number of protocols well known to those skilled in the art, including Wi-Fi, IRDa, Wi-Max and others.

Another option for implementing the functions of the communication/synchronization signal 28 was described in Eaves 2012, referring to methods known in the art as "communication over power lines" or "communication or power line carrier" (PLC), also known as "power line digital subscriber line" (PDSL), "mains communication", or "broadband over power lines" (BPL). Yet another method for establishing the communication/synchronization signal 28 was described in Published US Pat. App. No. 2015/0215001 A1, "Packet Energy Transfer In-line Communications". The in-line communications method utilizes the period under PET protocol when the transmission pairs are isolated from the source (transmitter) and the load (receiver) as a "quiet" period to transfer voltage amplitude modulated data streams.

In addition to embedding a synchronization signal in the serial data stream, an interleaving phase shift value or offset can be provided from a central controller to allow multiple PCEs 12 and multiple PET switches S1, S2, . . . SN within each PCE 12 to be provided with individual phase shift control. In one embodiment of series arrangements of PCEs 12, the synchronization signal 28 can be used to apply the identical phase shift value to all of the PCEs 12 in the series string that are attached to the same PET transmission pair.

The communication/synchronization signal 28 can emanate from a digital power receiver 33, as is shown in FIG. 5. A digital power receiver with a suitable interface, albeit without the new concept of interleaving introduced herein was described in U.S. application Ser. No. 14/886,455, "Digital Power Receiver System". In another embodiment, the phase shift on interleaving can be randomized by the PCE element controller circuitry 15 and achieve much of the benefits achieved with synchronized interleaving. In additional embodiments, a combination of synchronized and randomized interleaving can be implemented in the system.

Referring again to FIG. 4, a bypass diode (DB) 31 and bypass switch (SB) 32 are useful in some embodiments where power control element (PCEs) 12 are connected in series, as in FIG. 5, to allow electrical current from other PCEs 12 to continue to flow when PET switches 51, S2, and SN are in a non-conducting state. The bypass function can be implemented with diode DB alone; the addition of bypass switch SB, however, reduces power losses due to the lower conduction losses found in many power semiconductors—for example, field effect transistors (FETs), that may embody SB versus the conduction losses found in a diode. Alternatively, diode DB may be eliminated altogether if SB is implemented, although DB offers the advantage of a relatively fail-safe method for allowing the overall string to operate if SB or a PET switch S1, S2, or SN were to fail.

It should be noted that in instances where there is more than one PET switch, meaning that there is more than one PET transmission line pair, a dedicated bypass diode (DB) and/or bypass switch (SB) is implemented for each pair. For simplicity, FIG. 4 shows only one bypass diode (DB) and one bypass switch (SS). In practice, three bypass diodes and three bypass switches are used for the three corresponding PET switches S1, S2, and SN. In each instance, switch SB is operated by the element controller circuitry 15 to be in a non-conducting state whenever its corresponding PET switch S1, S2, or SN is in a conducting state; otherwise, SB appears as an electrical short circuit.

Figure 6:
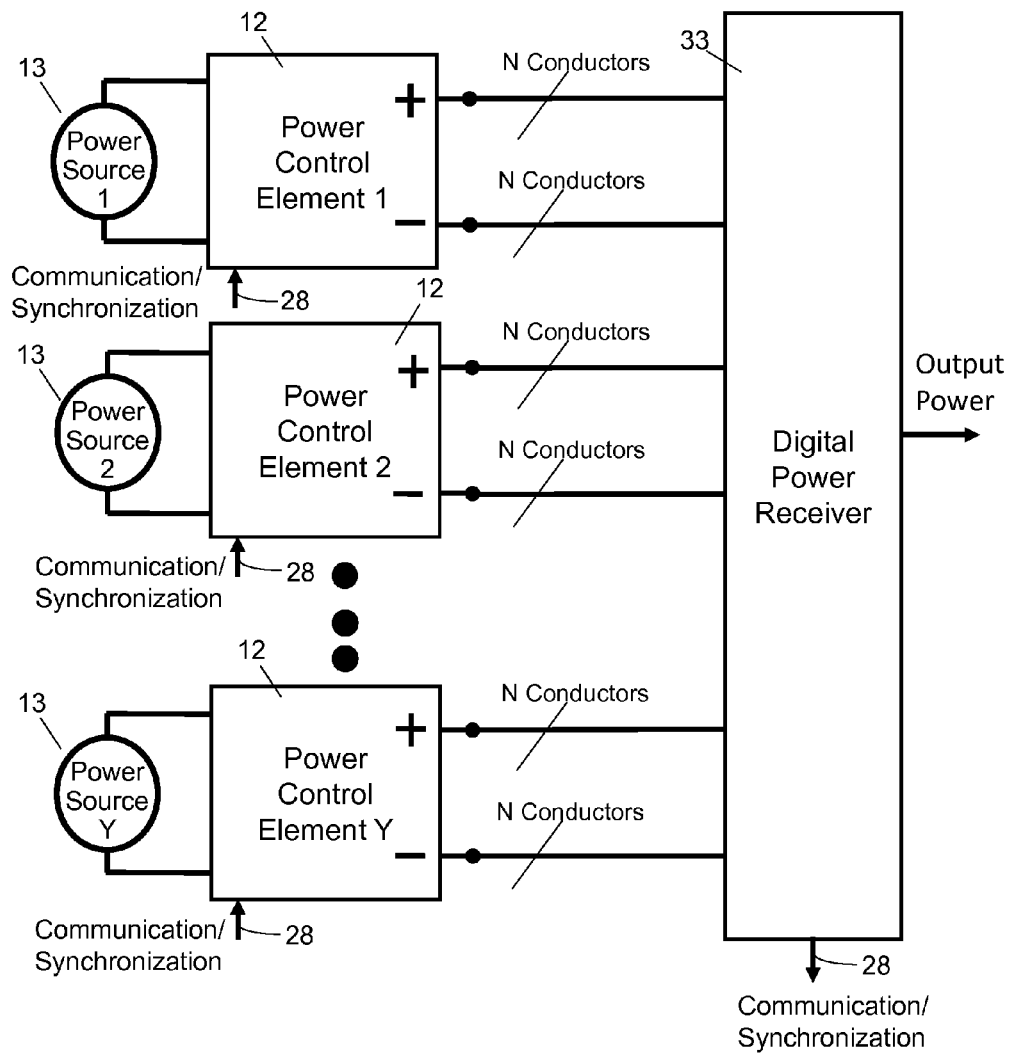
FIG. 6 shows power control elements (PCEs) 12 fed by individual power sources 13 and arranged in parallel, supplying a single digital receiver 33 that is the source of a communication/synchronization signal 28.

FIG. 6 depicts one embodiment of PCEs 12 fed by individual power sources 13 and arranged in parallel, supplying a single digital receiver 33. In this case, the digital receiver 33 is the source of the communication/synchronization signal 28 and maximizes the power quality provided by the PCEs 12 to the receiver 33 through optimization of the interleaving phase shift values.

Figure 7:
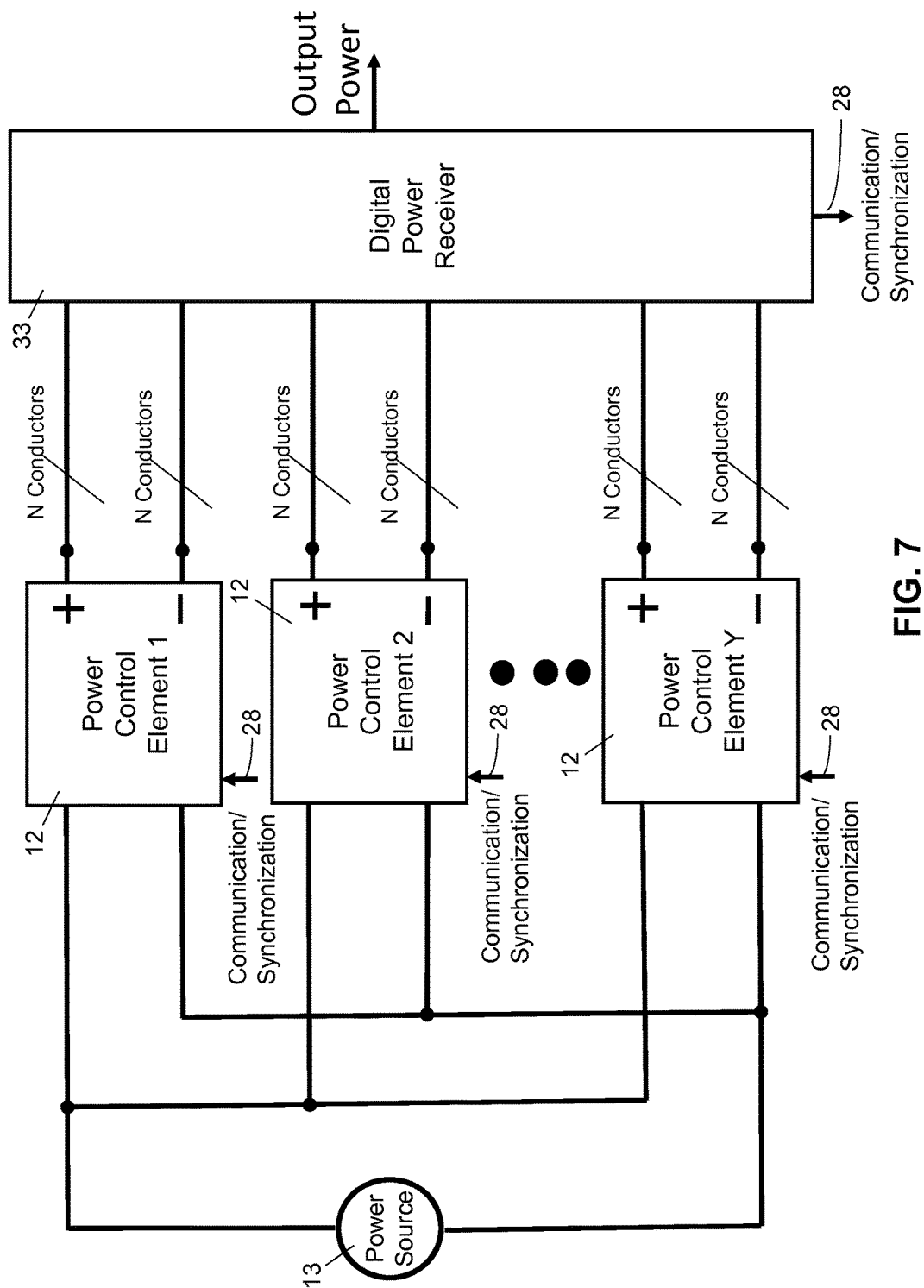
FIG. 7 shows PCEs 12 fed by a single power source 13, where the PCEs 12 are arranged in parallel, supplying a single digital receiver 33 that is the source of a communication/synchronization signal 28.

FIG. 7 depicts one embodiment of PCEs 12 fed by a single power source 13, where the PCEs 12 are arranged in parallel, supplying a single digital receiver 33. In this case, the digital receiver 33 is the source of the communication/synchronization signal 28 and maximizes the power quality drawn from the single source 13 by the PCEs 12 optimization of the interleaving phase shift values.

Figure 8:
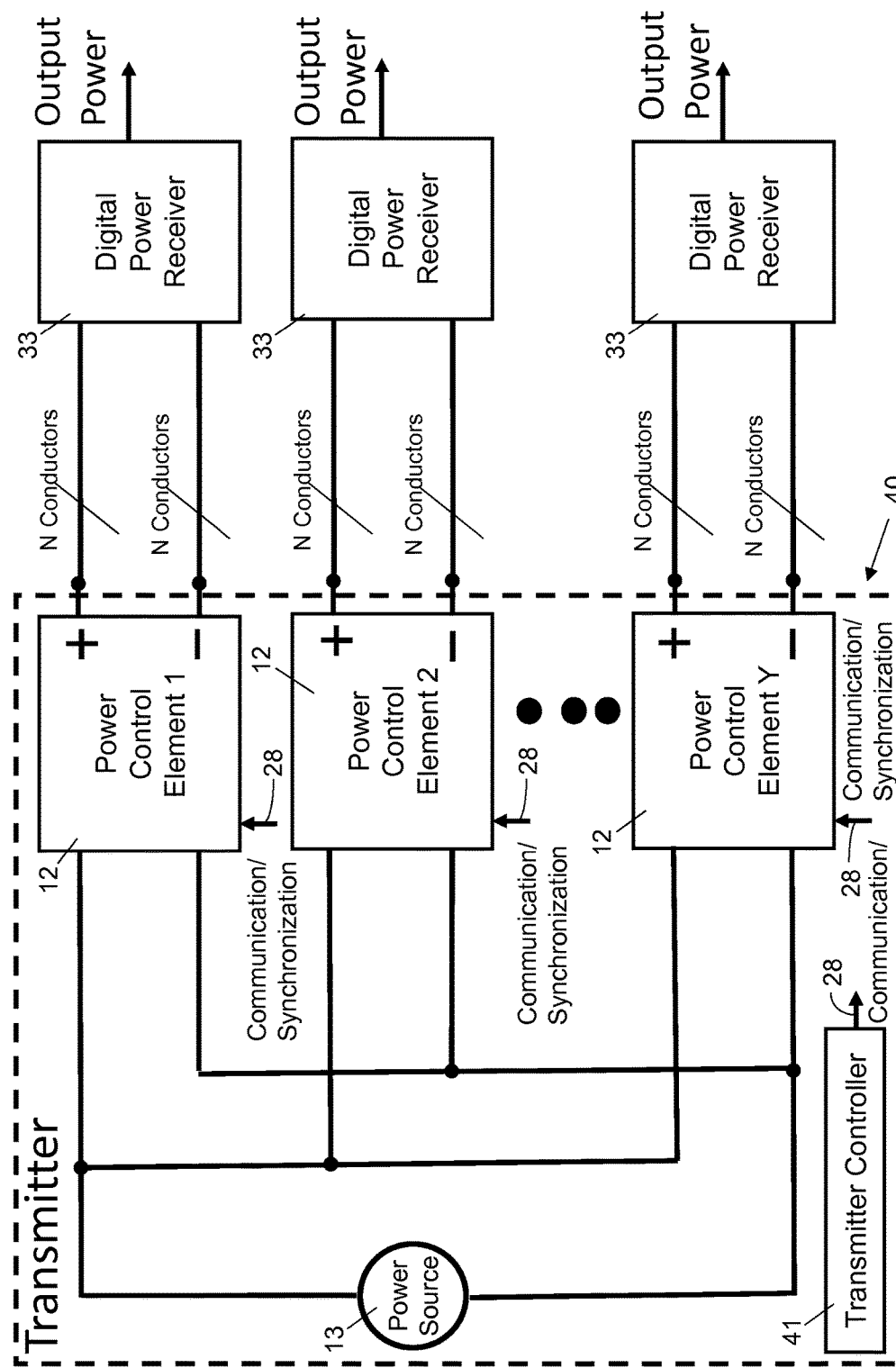
FIG. 8 depicts a digital power transmitter 40 comprising a plurality of PCEs 12, fed by a single power source 13 and including a transmitter controller 41 that is the source of the communication/synchronization signal 28.

FIG. 8 depicts a digital power transmitter 40 comprising a plurality of PCEs 12, fed by a single power source 13 and including a transmitter controller 41 that is the source of the communication/synchronization signal 28 and that maximizes the power quality drawn from the single source 13 by the PCEs 12 through optimization of the interleaving phase shift values.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, 1/2, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A digital power system, comprising:
   at least one electrical power source;
   at least one power control element, including:
   i) a power conditioning circuit electrically coupled with the electrical power source; and
   ii) element controller circuitry electrically coupled with the power conditioning circuit and configured to control and receive feedback from the power conditioning circuit, to receive a communication/synchronization signal, and to output digital power under packet energy transfer protocol; and
   a digital power receiver electrically coupled with the power control element to receive electrical current therefrom.

2. The digital power system of claim 1, wherein the element control circuitry includes a plurality of packet-energy-transfer transmission line pairs and a plurality of packet-energy-transfer switches configured to respectively and discretely control electric current flow through the packet-energy-transfer transmission line pairs.

3. The digital power system of claim 2, wherein the element control circuitry is configured to discretely and sequentially open and close particular packet-energy-transfer switches or combinations of packet-energy-transfer switches in response to the communication/synchronization signal.

4. The digital power system of claim 2, further comprising a bypass diode and a bypass switch electrically connecting and configured to control electrical current flow between members of each respective packet-energy-transfer transmission line pair, wherein the bypass switch is configured to receive instruction from the element controller circuitry to be in a non-conducting state whenever its corresponding packet-energy-transfer switch is in a conducting state and to appear at other times as an electrical short circuit.

5. The digital power system of claim 1, wherein the system includes a plurality of power control elements.

6. The digital power system of claim 5, wherein the power control elements are electrically connected in series.

7. The digital power system of claim 6, wherein the power control elements are electrically connected in parallel.

8. The digital power system of claim 1, wherein the digital power receiver is configured to generate and transmit the communication/synchronization signal.

9. The digital power system of claim 1, wherein the element controller circuitry is configured to generate and transmit the communication/synchronization signal.

10. The digital power system of claim 1, further comprising a transmitter controller configured to generate and transmit the communication/synchronization signal.

11. A method for configuring a power control element in a digital electric power network, comprising:
    delivering a flow of electrical current to at least one power control element comprising a power conditioning circuit and element controller circuitry including a plurality of packet-energy-transfer switches that control the flow of the electrical current through packet-energy-transfer transmission line pairs in the power control element;
    using the power conditioning circuit to stabilize, regulate or convert an input voltage of the electrical current flow in the power control element;
    using the element controller circuitry to receive the current flow from the power conditioning circuit, to control and receive feedback from the power conditioning circuit, and to output digital power under packet energy transfer protocol from the power control element;
    communicating a communication/synchronization signal to the element controller circuitry to selectively open and close different packet-energy-transfer switches in sequence; and
    delivering to a digital power receiver the output digital power under packet energy transfer protocol, wherein the output digital power is delivered from at least one packet-energy-transfer transmission line pair controlled by at least one closed packet-energy-transfer switch in the power control element.

12. The method of claim 11, the opening and closing of the plurality of packet-energy-transfer switches is staggered such that at least a first of the packet-energy-transfer switches is open while at least a second of the packet-energy-transfer switches is closed.

13. The method of claim 12, further comprising closing the first packet-transfer switch and opening the second packet-energy-transfer switch when the first packet-energy-transfer switch is closed.

14. The method of claim 11, wherein the flow of electrical current is delivered through a plurality of the power control elements in sequence.

15. The method of claim 11, wherein the flow of electrical current is delivered through a plurality of the power control elements in parallel.

16. The method of claim 11, further comprising, in response to an instruction from the element controller circuitry, opening a bypass switch in a conductive pathway between members of a packet-energy-transfer transmission line pair when a packet-energy-transfer switch in the packet line pair is in a conducting state; and closing the bypass switch when the packet-energy-transfer switch is in a non-conducting state.

17. The method of claim 11, wherein the digital power receiver generates and transmits the communication/synchronization signal to the element controller circuitry.

18. The method of claim 11, wherein the element controller circuitry generates and transmits the communication/synchronization signal to the element controller circuitry.

19. The method of claim 11, further comprising using a transmitter controller to generate and transmit the communication/synchronization signal to the element controller circuitry.

* * * * *